US005598164A

United States Patent [19]
Reppas et al.

[11] Patent Number: 5,598,164
[45] Date of Patent: Jan. 28, 1997

[54] VEHICLE OBSTACLE AVOIDANCE SYSTEM

[76] Inventors: George S. Reppas, 1030 San Raymundo Rd., Hillsborough, Calif. 94010; Robert G. Reppas, 48 Highland, Apt. 2, Cambridge, Mass. 02139; Charles B. Reppas, 502 225th Pl., SE., Bothell, Wash. 98021

[21] Appl. No.: 103,849

[22] Filed: Aug. 9, 1993

Related U.S. Application Data

[63] Continuation-in-part of Ser. No. 926,281, Aug. 10, 1992, abandoned.

[51] Int. Cl.⁶ .................................................. G01S 13/93
[52] U.S. Cl. ........................ 342/70; 340/903; 340/435; 340/436; 342/71; 342/72
[58] Field of Search ............................ 342/70, 71, 72; 340/435, 436, 903

[56] References Cited

U.S. PATENT DOCUMENTS

| | | | |
|---|---|---|---|
| Re. 34,773 | 11/1994 | Dombrowski | 340/904 |
| 3,559,756 | 2/1971 | Torres | 342/71 X |
| 3,687,213 | 8/1972 | Sato et al. | 342/72 X |
| 3,697,985 | 10/1972 | Faris et al. | 342/72 |
| 3,710,383 | 1/1973 | Cherry et al. | 342/71 |
| 3,725,921 | 4/1973 | Weidman et al. | 342/71 |
| 3,735,398 | 5/1973 | Ross | 342/72 X |
| 3,750,169 | 7/1973 | Strenglein | 342/21 |
| 3,778,823 | 12/1973 | Sato et al. | 342/72 |
| 3,778,826 | 12/1973 | Flannery et al. | 342/71 |
| 3,944,972 | 3/1976 | Chandler | 340/74 |
| 3,974,501 | 8/1976 | Ritzie | 342/128 |
| 3,978,481 | 8/1976 | Angwin et al. | 342/59 |
| 4,028,662 | 6/1977 | Young | 342/70 X |
| 4,039,782 | 8/1977 | Burckhardt et al. | 342/71 X |
| 4,069,888 | 1/1978 | Wolters et al. | 342/71 X |
| 4,072,945 | 2/1978 | Katsumata et al. | 342/70 |
| 4,217,582 | 8/1980 | Endo et al. | 342/70 |
| 4,349,823 | 9/1982 | Tagami et al. | 342/70 |
| 4,549,181 | 10/1985 | Tachibana et al. | 342/70 X |
| 4,641,136 | 2/1987 | Kowalczyk | 342/71 X |
| 4,673,937 | 6/1987 | Davis | 342/72 |
| 4,916,450 | 4/1990 | Davis | 342/71 |
| 4,926,171 | 5/1990 | Kelley | 340/961 |
| 5,008,678 | 4/1991 | Herman | 342/70 X |
| 5,087,918 | 2/1992 | May et al. | 342/85 |
| 5,162,794 | 11/1992 | Seith | 340/903 |
| 5,212,467 | 5/1993 | Park | 340/435 |
| 5,235,316 | 8/1993 | Qualizza | 340/436 |
| 5,281,949 | 1/1994 | Durley et al. | 340/433 |
| 5,293,152 | 3/1994 | Bussin et al. | 340/435 |
| 5,313,189 | 5/1994 | Dodd et al. | 340/433 |
| 5,319,350 | 6/1994 | DeMarco et al. | 340/435 |
| 5,339,075 | 8/1994 | Abst et al. | 340/903 |
| 5,349,430 | 9/1994 | Yamamoto et al. | 356/5 |
| 5,416,704 | 5/1995 | Takai | 364/424.05 |
| 5,434,554 | 7/1995 | Caesar | 340/468 |

*Primary Examiner*—John B. Sotomayor
*Attorney, Agent, or Firm*—Harness, Dickey & Pierce

[57] ABSTRACT

A system for warning a vehicle driver of obstacles to the front, rear and sides of the vehicle. If the vehicle is stopped and a front or rear obstacle is detected, the vehicle is prevented from moving forward or reverse, respectively. The inhibition of movement can be overridden by the driver once he acknowledges the obstacle. Similarly, the driver is warned of front, rear and side obstacles while the vehicle is moving. In the case of side obstacles, only when it appears that the driver will move the vehicle toward the obstacle is he warned.

18 Claims, 2 Drawing Sheets

VEHICLE OBSTACLE AVOIDANCE SYSTEM

This application is a continuation-in-part of U.S. Ser. No. 07/926,281, filed Aug. 10, 1992, by George S. Reppas, Robert G. Reppas and Charles B. Reppas entitled "Turn Signal Actuated Avoidance Radar" now abandoned.

BACKGROUND OF THE INVENTION

1. Technical Field

This invention relates to a system and method for detecting incipient collisions, and more particularly to detecting incipient collisions between passenger vehicles and other bodies, objects or passenger vehicles.

2. Discussion of the Related Art

The use of radar to detect the presence and/or speed of objects has become widespread. For example, law enforcement personnel use radar to measure the speed of vehicles, and large vessels such as ships and airplanes use radar to determine their position with respect to other vessels. On a smaller scale, radar is used in automated factories to ensure proper spacing between autonomous roving vehicles.

For passenger vehicles, the use of radar is rather limited. Some systems have been proposed for providing head-on collision avoidance through the use of a full time radar position sensing system. Using such a system, the driver of a trailing vehicle is provided a warning in the event he gets too close to the leading vehicle.

There are several disadvantages with most existing systems. First, with most existing systems, the radar detection apparatus is continuously operating. This does not necessarily pose a problem for vehicle collision detection systems where false warnings are unlikely. However, when attempting to implement a collision detection system for detecting incipient collisions with laterally adjacent vehicles, having the detection system active full time would be undesirable. This is because there are many instances when vehicles travel in the same general line of travel but in parallel paths. In such a situation, issuing a warning whenever a vehicle is next to another vehicle would result in an unacceptable level of false collision warnings. Indeed, such a collision avoidance system should only provide a warning to the vehicle driver when the driver risks selecting a line of travel already occupied by an adjacent vehicle. In those other instances when the driver of the vehicle will not be attempting to change the line of travel into that of an adjacent vehicle's, no warning is required. It would therefore be advantageous to provide for a system and method for detecting incipient collisions between adjacent vehicles traveling in generally parallel lines of travel. Such a system should be capable of discriminating between incipient collisions and non-threatening adjacency.

A second disadvantage of most existing systems is that there is no discrimination between cold-bodied objects, like other cars and garbage cans, and warm-bodied objects, like children and pets. Although any obstacle avoidance system should warn of obstacles regardless of whether they are warm or cold bodied, it can be appreciated that warm-bodied objects should particularly be avoided because a collision with a warm-bodied object will likely be more emotionally upsetting to the driver. Therefore, it would be advantageous if the system and method were capable of distinguishing warm bodies from cold bodies and of modifying the action taken appropriately.

Another disadvantage of most existing systems is that the detection apparatus does not change its range dependent upon speed. For example, when the vehicle is parked or traveling slowly, objects which are very close are of more interest than those far away. Conversely, at high speeds, objects farther away become relevant. It would therefore be advantageous if the detection scheme could modify the range or type of detection used to fit the conditions.

Yet another disadvantage of most known systems is that the warning does not change to match the type of threat detected. For example, an adjacent vehicle traveling along side in the side blind spot would generate the same warning as a child darting out in front of the car. Thus, when the driver hears the warning, he can only be sure that something has been detected somewhere, but he is provided no information as to where or what it is. Therefore, providing warnings which are tailored to the threat posed would be advantageous.

SUMMARY OF THE INVENTION

Therefore, a system and method are provided wherein warnings of an incipient collision are issued dependent upon a variety of different conditions. For side adjacent obstacles while the vehicle is moving, a localized warning is issued whenever an incipient collision is detected and the system user has issued a collision detection request. One feature of the present invention is that the frequency of erroneous signals is greatly reduced over that of a full time system, since the user selectively activates and deactivates the system. Another feature is that the localized warning provides information to the driver as to the location of the obstacle. One advantage of the present invention is that it can be easily implemented on passenger vehicles, with the turn signal providing the actuation interface between the driver and the detection system and the audio system providing the means to localize the warning. For warm-bodied obstacles detected nearby while the vehicle is parked and attempting to move, the warning is combined with the step of requiring the driver to acknowledge he is aware of the obstacle before being able to move the vehicle. Similarly, if an obstacle is detected under the bumper of the vehicle when attempting to leave a parked position, the driver is warned and is required to acknowledge he is aware of the obstacle before being able to proceed over the obstacle. One feature is that preventing movement of the vehicle until the driver acknowledges the warning reduces the risk that the driver will accidentally start driving away with a child or pet in its path, or that the driver will damage his car by driving over an obstacle like a parking block. An advantage is that most cars are already equipped with shift interlocks which prevent the driver from shifting from park into gear unless the driver performs a specified task, like actuating the brake pedal.

BRIEF DESCRIPTION OF THE DRAWINGS

These and other objects, features and advantages of the present invention will become more apparent through reference to the foregoing description of the presently preferred embodiment in conjunction with the drawings in which.

DETAILED DESCRIPTION OF THE PRESENTLY PREFERRED EMBODIMENT

Figure 1:
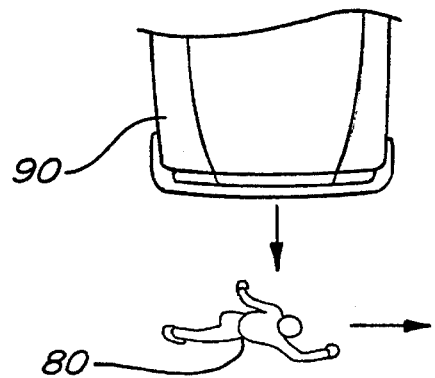
FIGS. 1 and 2 are illustrations showing the type of obstacles confronting a vehicle.
Figure 1:
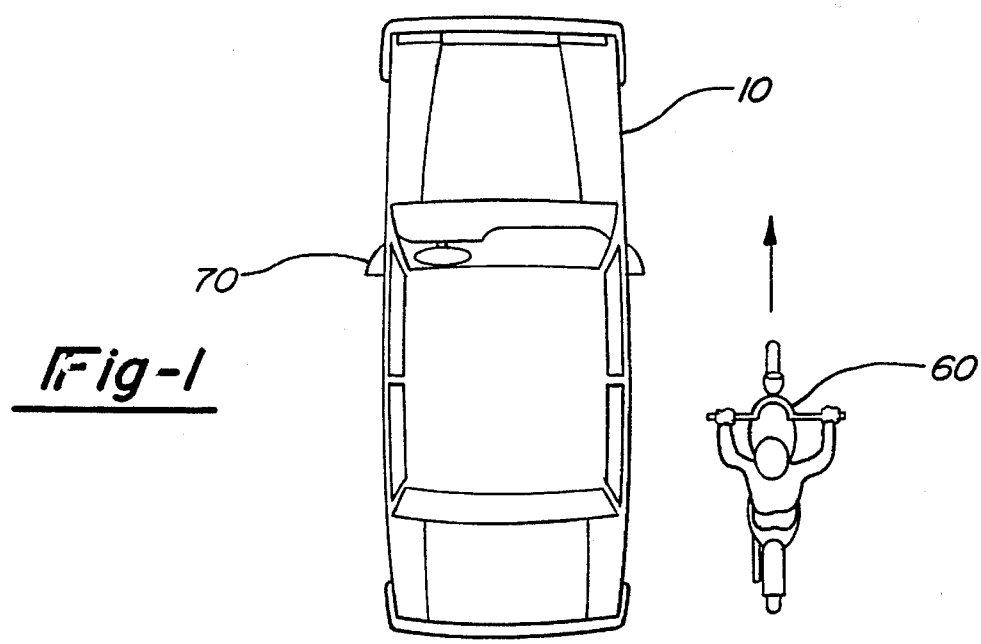
Figure 2:
Figure 2:
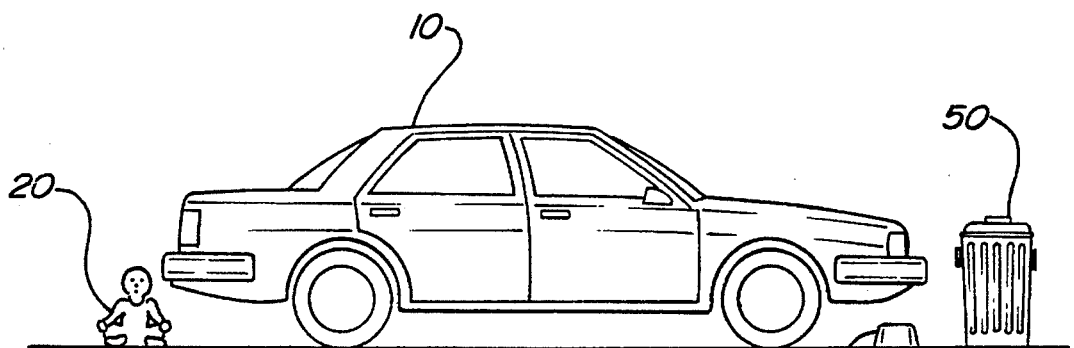

Drivers are confronted with a variety of obstacles which they must avoid both while driving and even when trying to leave a parked position. Besides avoiding oncoming objects and objects which cross its path while moving, there are objects which may lie in side blind spots adjacent to the traveling vehicle. For the purposes of discussion, FIGS. 1 and 2 illustrate some of these obstacles. Assuming the vehicle 10 is parked, obstacles like a child 20 playing behind the vehicle and out of the line of sight of the driver are particularly worrisome. This is because small children often become absorbed in their play and fail to really pay attention to what is going on around them. Therefore, since the driver cannot count on the child moving out of the way simply because the car has been started, he must be careful to ensure the child moves before he proceeds to back up the vehicle. Likewise, children often leave their toys 30 behind parked vehicles. These, too, must be moved by the driver before he proceeds. Another type of obstacle frequently encountered is a parking block 40. Parking blocks 40 often become completely obscured under the vehicle 10 when parking in a parking lot. Thus, even if the driver looks in front and behind the vehicle for objects, he may not see the parking block 40. Likewise, obstacles like logs and rocks often become obscured by the vehicle bumpers once the vehicle is parked. Unfortunately, driving over a parking block, rock or log can not only startle the driver, but can cause damage to the undercarriage of the vehicle 10. Even those obstacles that are large, like a garbage can 50, can be accidentally struck when moving the car from a parked position because the driver may become distracted and accidentally put the vehicle into "drive" when he meant to put it into "reverse." Thus, when driving a vehicle from a parked position, there are many different types of obstacles the driver must watch out for.

While the vehicle is under way, there are different types of obstacles to watch for. As shown best in FIG. 1, other vehicles often travel adjacent to the driver's vehicle 10, yet these vehicles often travel in a "blind spot" that makes the vehicle hard to observe—especially motorcycles 60 which are significantly shorter and narrower than cars. While side view mirrors 70 help alleviate some of these blind spots, some blind spots still remain. Of those blind spots that cannot be remedied through the use of side view mirrors, the blind spots occupying the vicinity of the side and rear quarter panels are the most dangerous when traveling. This is because the driver's view of an adjacent vehicle is almost wholly obstructed within these blind spots. Of course, the driver can reduce the risk of accidentally colliding with an adjacent vehicle by both turning his head and checking his mirrors; but many drivers are careless and fail to perform such a dual level safety check. It is for drivers such as this that a side and rear quarter panel collision avoidance system could provide a warning of an incipient collision which may otherwise go unnoticed by the driver. Moreover, especially with larger vehicles like trucks or with sports cars having wide, stylized roof pillar, there are some blind spots which cannot be alleviated by mirrors and for which the driver cannot satisfactorily turn his head to look for obstacles. Also, if the driver is required to turn his head sideways to look for adjacent obstacles, the driver runs the risk of not noticing a dangerous situation in front of him. Thus, relieving the driver from having to look for adjacent obstacles allows the driver to better focus his attention on objects in front of the vehicle. This is especially important on freeways, where vehicles travel at high speeds and where the vehicles often travel too closely to each other causing a driver to have a reduced reaction time when confronted with an incipient collision. Moreover, since there are blind spots on both sides of the vehicle, it would be advantageous if the warning provided to the driver were localized, That is, if there is an obstacle on the right, the warning should sound from the right side of the vehicle to alert the driver that the obstacle is to the right, rather than the left, rear or front.

Other obstacles while driving include objects which enter the on-coming path of the vehicle. Children often 80 dart out to chase pets or balls when playing, and on-coming vehicles 90 may stray into the wrong lane of traffic. In the instance of the child 80 darting out, the obstacle will often be close, will appear suddenly and will be warm-bodied. Such an obstacle presents an immediate hazard and should be reacted to quickly. Conversely, the on-coming vehicle 90 which strays into the wrong lane is usually farther away and closes as the vehicles continue on their course. Therefore, the driver often has more time to observe the obstacle and to react accordingly.

Figure 3:
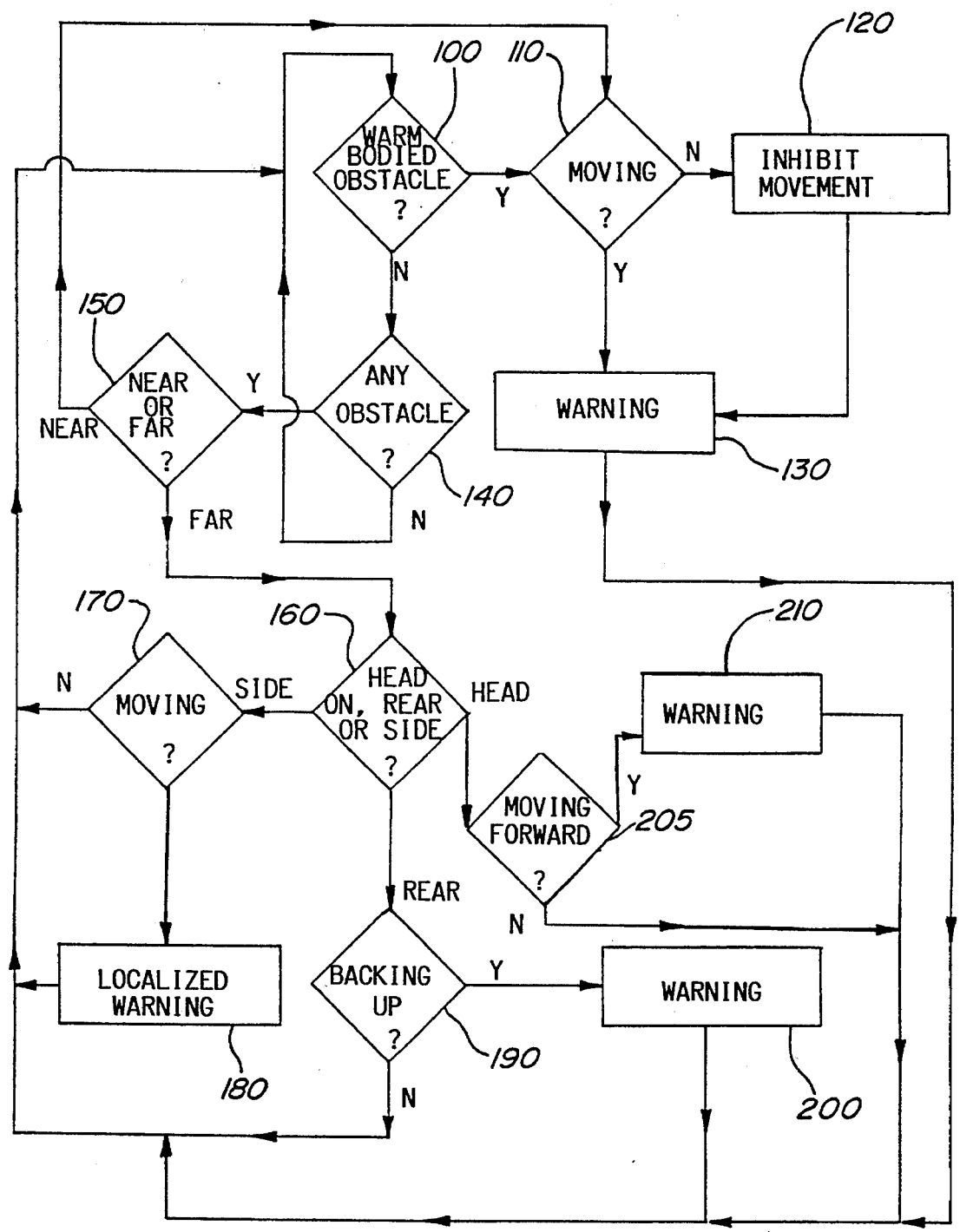
FIG. 3 is a function diagram illustrating the detection and discrimination scheme employed by the present invention.

As depicted in FIG. 3, the system of the presently preferred embodiment includes a discrimination scheme which determines the state of the vehicle and of the obstacle and which issues an appropriate warning. Specifically, when dealing with a warm-bodied obstacle 100, if the car is currently in park and the driver tries to put the car in gear 110, the car will be prevented from moving 120 and a warning issued 130. Since most vehicles are equipped with a shift interlock which prevents the vehicle from being put into gear unless the driver has his foot on the brake, it would be well within the ordinary skill in the art to utilize a shift interlock to prevent movement of the vehicle. Similar to the conventional shift interlocks which prevent shifting into gear unless the brake pedal is depressed, the driver would be required to actuate a button to indicate he has acknowledged the detected obstacle and wishes to proceed regardless. This button can obviously be located on the dashboard, the shift console, the shift handle, or any other location within the reach of the driver. If a warm-bodied obstacle enters the path of the vehicle while it is under way, it will be detected 100 and a warning will be issued 130, but movement of the vehicle will not be inhibited. This is because the vehicle is already moving, and suddenly stopping the vehicle automatically may startle the driver.

Moreover, it can be appreciated that, instead of detecting whether the vehicle is in park, the system could instead detect if the vehicle is stopped. Again, existing vehicle systems can be exploited to achieve this function. For example, antilock braking systems measure wheel speeds and monitor the brake pedal. Here, if the wheel speeds are zero and the brake pedal is depressed, the vehicle must be stopped. Since the vehicle may already be in gear in such a situation, the obstacle detection system would inhibit movement of the vehicle by actuating the brakes if an obstacle is detected in the path of the vehicle while it is resting.

To detect whether the obstacle is warm or cold bodied, the detection apparatus can be heat and movement sensing. Such heat and motion sensors are commonly used to cause the illumination of flood lights when a large warm body moves through its field of vision and may be readily adapted for use on a vehicle. Here, since moving warm-bodied obstacles are of special interest when backing up or driving forward from a parked position, heat and motion sensors can be located at the front and rear of the vehicle. It is not necessary to have heat and motion sensors at the sides of the vehicle because the vehicle cannot travel sideways from a parked position. Moreover, when under way, it is inconsequential whether the obstacle is warm or cold bodied—an obstacle located to the side in the blind spot should be avoided regardless. The manner in which it will be avoided will be described in greater detail later.

If the obstacle is not moving and is a cold-bodied obstacle, it will not be picked up by heat or motion sensors.

Therefore, a different type of detector is required. Here, radar may be used. The form of radar employed can be readily adapted by those of ordinary skill in the art. For example, doppler radar may be employed, in which the frequency shift in the signal is determined between the detection and reflection signal. Or, echo radar may be used, in which the time delay between the reflection of two different signals is measured. Additionally, ranging radar may be employed, where any object within a predetermined range will cause the reflected signal to be received within the detection time frame and objects outside the range will not. Other types of detection schemes can be employed as well. Laser detectors may be used, where the reflected light phase or time of arrival is used to determine distance. Regardless of the forms of detection employed, it can be appreciated that obstacles to the front, rear or sides of the vehicle would be of interest. Also, when the vehicle is parked, obstacles which are located toward the underside of the vehicle at the front or rear become of interest. Therefore, it would be advantageous to have detectors aimed toward these areas, as well as having detectors aimed outward to detect approaching obstacles.

Continuing on with FIG. 3, if a cold-bodied obstacle is detected 140 and it is near 150, a collision is almost certain. Therefore, if the car is still parked 110 and the driver attempts to put the car in gear to move toward the obstacle, the vehicle movement will be inhibited 120 and a warning issued 130. However, if the car is already under way 110, a warning will be issued 130 but movement will not be inhibited. These situations are handled similar to that of the warm-bodied obstacle—that is, the driver must override the inhibit interlock 120, when invoked, to proceed. Here, it can be appreciated that a near obstacle can be either an approaching obstacle, like a car, child, or vehicle, or could be a stationary obstacle that is close, like a toy or garbage can that can damage the body panels, or could be a rock or parking block that can damage the undercarriage. If the obstacle is near and the vehicle is not yet moving, inhibiting movement prevents the driver from inadvertently driving into the obstacle.

Besides preventing the driver from putting the vehicle in gear if there is an obstacle, the system could inhibit movement of the vehicle 120 by actuating the brakes. Since many vehicles are equipped with antilock brakes and traction control systems, the means for actuating the brakes is readily available. By actuating the brakes, the system could inhibit movement when the vehicle is in gear, rather than park, but is stopped nonetheless 110. Such a situation occurs at traffic stops, for example. As described above, the driver may override the inhibit. Here, it is important to realize that the objective is still to prevent the driver from launching the vehicle from a resting position unless he somehow acknowledges that he is aware of the obstacle of which he is being warned.

In those instances where the obstacle is not warm-bodied 100, 140 and is farther away 150, the type of warning issued will vary depending upon whether the obstacle is located to the front, rear or side of the vehicle. If the obstacle is located to the side 160 and the vehicle is stationary 170, no warning is necessary because there is no way for the vehicle to move sideways toward the obstacle. However, if the vehicle is moving 170, then it is possible to change lanes toward the obstacle. Therefore, the warning issued 180 is localized to indicate which side the obstacle is on. For example, if the obstacle is to the left, the warning should emit from the left to alert the driver that there is a left obstacle. Here, the audio system already present in the car can be employed, or separate emitters can be employed. To provide the localized warning 180, the system simply emits a tone from the speaker on the left or right side as appropriate. One of ordinary skill can appreciate that such a localized warning system can be readily implemented. As an additional feature, it may be desirable to issue a localized warning only once it becomes apparent that the driver may change lanes into the adjacent obstacle. This can be readily achieved by monitoring the turn signal indicator of the vehicle 10. If the detectors detects a side adjacent object and the driver activates the turn signal to change lanes toward that side, a warning is emitted from that side of the vehicle. By making the warning dependent upon the driver indicating he wishes to move toward the obstacle, the incidence of false warnings is reduced. That is, if the driver has no desire to change lanes, warning him of a side adjacent obstacle would be irrelevant. Therefore, there is no need to issue a warning if he isn't going to change lanes toward the obstacle. The system could further anticipate driver lane changes without monitoring the turn signal indicator by instead monitoring the steering wheel position. If the steering wheel is turned to the left and there is an obstacle to the left of the vehicle while the vehicle is moving, the warning would be activated. Here, by monitoring steering angle and by also monitoring the distance between the vehicle and the obstacle, the system can determine whether the vehicle is simply turning as the road turns, or if the vehicle is veering toward the adjacent obstacle. Monitoring steering wheel angle would have the added benefit of alerting the driver who either fails to use his turn signal, or who has begun dozing off and is unaware that he has begun swerving into the adjacent lane.

If a cold-bodied object is detected behind the vehicle 160 and the vehicle is backing up 190, then a warning is issued 200. Likewise, if there is a cold-bodied object in front of the vehicle and it is moving forward 205, a warning is issued 210. Again, it can be appreciated that the warning may be localized so that an audible warning emits from the rear of the vehicle if there is a rear obstacle and the vehicle is backing up, or from the front if there is a front obstacle and the vehicle is moving forward.

The logic scheme of the presently preferred embodiment, as diagrammed in FIG. 3, has been provided for the purposes of discussion. One of ordinary skill can appreciate that the method and system described here could be readily implemented using circuitry to perform the discrimination tasks, or by using a microcomputer. Since the presently preferred embodiment is best suited to passenger automobile applications, it is convenient to provide power to the system whenever the vehicle's ignition is in the "run" position. It can further be appreciated by one of ordinary skill in the art that it may be desirable to perform power on integrity checks, commonly referred to as diagnostics, to ensure system integrity upon powering up.

When activating the warning alarm, the logic scheme of the presently preferred embodiment provides a variable warning depending upon the proximity of the adjacent object. For example, if the object is very close to the vehicle thereby presenting a more immediate threat of collision, the warning alarm is activated in a more urgent manner. This can take the form of sounding a tone louder, or sounding a tone using very short, frequent bursts. For objects that are farther away, the tone can be sounded at a lower volume, or pulsed in short bursts at a lower rate of repetition. Similarly, it can be appreciated that it may be desirable to provide a detection proximity cut-off, whereby objects further than a predetermined distance away from the vehicle do not cause a warning signal to be generated. This would be helpful in reducing the frequency of unnecessarily generated warning signals. In addition to the localized audible warnings described above, it can be appreciated that a visual warning scheme could be substituted or could be employed as a supplement. Such a visual warning scheme could include a pictogram with a pictorial representation of the vehicle and any detected obstacles. For objects that are very close the color could be more brilliant to indicate urgency or the pictogram image could flash rapidly, and for farther objects the color could be less brilliant or the flashing less rapid. The pictogram could also provide a relative representation of the positions of the vehicle or obstacles, with closer objects shown closer and farther objects shown farther away.

It can be appreciated that a comprehensive detection system such as described herein could be useful in a number of applications. For example, besides passenger vehicles operating on freeways or surface streets, other vehicles could benefit from the invention. School buses, which make frequent stops and starts and which are often surrounded by noisy, distracted children could benefit from the features which prevent the vehicle from launching from a stopped position if there is a warm body in its path. Likewise, delivery trucks which make frequent stops in busy areas would benefit from the warm-body detecting capabilities. Moreover, the driver of any vehicle having blind spots, especially large trucks or buses, would benefit from being warned of all kinds of obstacles, regardless of whether they are warm or cold bodied obstacles.

It can be appreciated by one of ordinary skill in the art that modifications could be exercised without departing from the spirit or scope of the invention disclosed herein.

What is claimed is:

1. A vehicle system for warning of obstacles, the system comprising:

detection means for detecting the relationship of said obstacles to said vehicle;

discrimination means for determining the state of said vehicle, said state including whether said vehicle is moving or stationary, said discrimination means determines whether said vehicle is stationary by determining if said vehicle is in park or stopped;

logic means for interpreting said vehicle state and said relationship of said obstacles and for automatically causing forward movement of said vehicle to be inhibited without driver interaction when said vehicle state indicates said vehicle is stationary and when said detection means indicates said obstacle is within a predetermined proximity of said vehicle and when said obstacle is forward of said vehicle by automatically preventing said vehicle to be put in gear if said vehicle is in park or by automatically actuating a brake if said vehicle is stopped, thereby automatically preventing said driver from inadvertently driving forward into said obstacle, and for automatically causing rearward movement of said vehicle to be inhibited without driver interaction when said vehicle state indicates said vehicle is stationary and when said detection means indicates said obstacle is within said predetermined proximity of said vehicle and when said obstacle is rearward of said vehicle by automatically preventing said vehicle to be put in gear if said vehicle is in park or by automatically actuating said brake if said vehicle is stopped, thereby automatically preventing said driver from inadvertently driving rearward into said obstacle; and overriding means for overriding said inhibition of said vehicle movement upon acknowledgment of said obstacle by said driver.

2. A system as recited in claim 1 wherein said logic means is further adapted for causing a perceptible warning to be issued to said driver when said detection means indicates said obstacle is forward of said vehicle and when said vehicle state indicates said vehicle is moving forward, and for causing said perceptible warning to be issued when said vehicle state indicates said vehicle is stationary and is being inhibited from moving forward, and for causing said perceptible warning to be issued to said driver when said detection means indicates said obstacle is rearward of said vehicle and when said vehicle state indicates said vehicle is moving rearward, and for causing said perceptible warning to be issued when said vehicle state indicates said vehicle is stationary and is being inhibited from moving rearward.

3. A system as set forth in claim 1 wherein said logic means is further adapted to determine vehicle steering heading and wherein a perceptible warning is issued when said vehicle state indicates said vehicle is moving and when said detection means indicates said obstacle is within said predetermined proximity of said vehicle and when said obstacle is left of said vehicle and when said vehicle steering heading indicates said driver is moving said vehicle toward the left, and wherein said warning is issued when said vehicle state indicates said vehicle is moving and when said detection means indicates said obstacle is within said predetermined proximity of said vehicle and when said obstacle is right of said vehicle and when said vehicle steering heading indicates said driver is moving said vehicle toward the right.

4. A system as set forth in claim 1 wherein said vehicle includes a turn signal indicator for indicating said driver's intention to change lanes, and wherein a perceptible warning is issued when said vehicle state indicates said vehicle is moving and when said turn signal indicator indicates said driver's intention to move said vehicle leftward and when said obstacle is within said predetermined proximity of said vehicle and when said obstacle is left of said vehicle, and wherein said warning is issued when said vehicle state indicates said vehicle is moving and when said turn signal indicator indicates said driver's intention to move said vehicle rightward and when said obstacle is within said predetermined proximity of said vehicle and when said obstacle is right of said vehicle.

5. A system as set forth in claim 2 wherein said logic means is further adapted to determine vehicle steering heading and wherein said perceptible warning is issued when said vehicle state indicates said vehicle is moving and when said detection means indicates said obstacle is within said predetermined proximity of said vehicle and when said obstacle is left of said vehicle and when said vehicle steering heading indicates said driver is moving said vehicle toward the left, and wherein said warning is issued when said vehicle state indicates said vehicle is moving and when said detection means indicates said obstacle is within said predetermined proximity of said vehicle and when said obstacle is right of said vehicle and when said vehicle steering heading indicates said driver is moving said vehicle toward the right.

6. A system as set forth in claim 2 wherein said vehicle includes a turn signal indicator for indicating said driver's intention to change lanes, and wherein said perceptible warning is issued when said vehicle state indicates said vehicle is moving and when said turn signal indicator indicates said driver's intention to move said vehicle leftward and when said obstacle is within said predetermined proximity of said vehicle and when said obstacle is left of said vehicle, and wherein said warning is issued when said vehicle state indicates said vehicle is moving and when said turn signal indicator indicates said driver's intention to move said vehicle rightward and when said obstacle is within said predetermined proximity of said vehicle and when said obstacle is right of said vehicle.

7. A system as set forth in claim 1 wherein the detection means can detect and distinguish between warm-bodied obstacles and cold-bodied obstacles.

8. A system as set forth in claim 1 wherein the detection means can detect and distinguish between non-moving obstacles and moving obstacles.

9. A system for warning a driver of a vehicle of obstacles, said system comprising:

detection means for detecting the relationship of said obstacles to said vehicle;

discrimination means for determining the state of said vehicle, said state including whether said vehicle is moving or not moving, said discrimination means determines whether said vehicle is not moving by determining if said vehicle is in park or stopped;

a turn signal apparatus having a directional lever actuable by said driver for indicating said driver's intent to change the attitude of said vehicle to the left or to the right; and logic means for interpreting said vehicle state, said relationship of said obstacles and said turn signal, and for causing a perceptible warning to be issued when said vehicle state indicates said vehicle is moving and when said detection means indicates said obstacle is left of said vehicle and said turn signal indicates said driver wishes to move said vehicle leftward, and for causing said warning to be issue when said vehicle state indicates said vehicle is moving and when said detection means indicates said obstacle is right of said vehicle and said turn signal indicates said driver wishes to move said vehicle rightward, and for automatically preventing forward movement of said vehicle without driver interaction when said vehicle state indicates said vehicle is not moving and when said detection means indicates said obstacle is in front of said vehicle by automatically preventing said vehicle to be put in gear if said vehicle is in park or by automatically actuating a brake if said vehicle is stopped, thereby automatically preventing said user from inadvertently driving into said obstacle, and for automatically preventing rearward movement of said vehicle without driver interaction when said vehicle state indicates said vehicle is not moving and when said detection means indicates said obstacle is behind said vehicle by automatically preventing said vehicle to be put in gear if said vehicle is in park or by automatically actuating said brake if said vehicle is stopped, thereby automatically preventing said user from inadvertently driving into said obstacle.

10. A system as set forth in claim 9 wherein when said vehicle state indicates said vehicle is moving and when said detection means indicates said obstacle is left of said vehicle and said turn signal indicates said driver wishes to move said vehicle leftward, said warning is issued from the left side of said vehicle to alert said driver that said obstacle is to the left of said vehicle, and wherein when said vehicle state indicates said vehicle is moving and when said detection means indicates said obstacle is right of said vehicle and said turn signal indicates said driver wishes to move said vehicle rightward, said warning is issued from the right side of said vehicle to alert said driver that said obstacle is to the right of said vehicle.

11. A system as set forth in claim 9 wherein said logic means is further adapted for causing said warning to be issued when said vehicle state indicates said vehicle is moving forward and said detection means indicates said obstacle is in front of said vehicle, and for causing said warning to be issued when said vehicle state indicates said vehicle is moving backward and said detection means indicates said obstacle is behind said vehicle.

12. A system as set forth in claim 10 wherein said logic means is further adapted for causing said warning to be issued when said vehicle state indicates said vehicle is moving forward and said detection means indicates said obstacle is in front of said vehicle, and for causing said warning to be issued when said vehicle state indicates said vehicle is moving backward and said detection means indicates said obstacle is behind said vehicle.

13. A system for warning a driver of a vehicle of obstacles, said system comprising:

detection means for detecting the relationship of said obstacles to said vehicle;

discrimination means for determining the state of said vehicle, said state including whether said vehicle is moving or stationary, said discrimination means determines whether said vehicle is stationary by determining if said vehicle is in park or stopped;

steering heading indicator means for indicating vehicle steering heading; and logic means for interpreting said vehicle state, said relationship of said obstacles and said vehicle steering heading, and for causing a perceptible warning to be issued when said vehicle state indicates said vehicle is moving and when said detection means indicates said obstacle is left of said vehicle and said vehicle steering heading indicates said driver has begun to move said vehicle leftward, and for causing said warning to be issued when said vehicle state indicates said vehicle is moving and when said detection means indicates said obstacle is right of said vehicle and said vehicle steering heading indicates said driver has begun to move said vehicle rightward, and for automatically causing forward movement of said vehicle to be inhibited without driver interaction when said vehicle state indicates said vehicle is stationary and when said detection means indicates said obstacle is in front of said vehicle by automatically preventing said vehicle to be put in gear if said vehicle is in park or by automatically actuating a brake if said vehicle is stopped, thereby automatically preventing said user from inadvertently driving into said obstacle, and for automatically causing rearward movement of said vehicle to be inhibited without driver interaction when said vehicle state indicates said vehicle is stationary and when said detection means indicates said obstacle is behind said vehicle by automatically preventing said vehicle to be put in gear if said vehicle is in park or by automatically actuating said brake if said vehicle is stopped, thereby automatically preventing said user from inadvertently driving into said obstacle.

14. A system as set forth in claim 13 wherein when said vehicle state indicates said vehicle is moving and when said detection means indicates said obstacle is left of said vehicle and said vehicle steering heading indicates said driver has begun to move said vehicle leftward, said warning is issued from the left side of said vehicle to alert said driver that said obstacle is to the left of said vehicle, and wherein when said vehicle state indicates said vehicle is moving and when said detection means indicates said obstacle is right of said vehicle and said vehicle steering heading indicates said driver has begun to move said vehicle rightward, said warning is issued from the right side of said vehicle to alert said driver that said obstacle is to the right of said vehicle.

15. A system as set forth in claim 13 wherein said logic means is further adapted for causing said warning to be issued when said vehicle state indicates said vehicle is moving forward and said detection means indicates said obstacle is in front of said vehicle, and for causing said warning to be issued when said vehicle state indicates said vehicle is moving backward and said detection means indicates said obstacle is behind said vehicle.

16. A system as set forth in claim 14 wherein said logic means is further adapted for causing said warning to be issued when said vehicle state indicates said vehicle is moving forward and said detection means indicates said obstacle is in front of said vehicle, and for causing said warning to be issued when said vehicle state indicates said vehicle is moving backward and said detection means indicates said obstacle is behind said vehicle.

17. A collision warning system in a vehicle for warning of an incipient collision in the blind spots of the vehicle located in adjacent lanes, wherein said vehicle has at least a first blind spot located toward the left of the vehicle to the rear of the driver in a left adjacent lane and a second blind spot located toward the right of the vehicle to the rear of the driver in a right adjacent lane, said system comprising:

detection means for detecting the presence of objects, said detection means operable to detect the presence of objects positioned in the first blind spot and the second blind spot regardless of the type of object or whether said objects are stationary, opening or closing with respect to the vehicle and regardless of the speed of the vehicle;

discrimination means for determining the state of said vehicle, said state including whether said vehicle is stationary or moving;

steering heading indicator means for indicating vehicle steering heading when a driver changes the direction of travel of the vehicle toward the left adjacent lane or the right adjacent lane;

logic means for interpreting said vehicle state and said presence of said objects and for automatically preventing forward movement of said vehicle when said vehicle state indicates said vehicle is not moving and said detection means indicates an object is in front of said vehicle, thereby automatically preventing said driver from inadvertently driving forward into said object; and warning means for issuing a localized audible warning to the driver when an object is detected in the first blind spot and said steering heading indicator means indicates the driver is traveling toward the left adjacent lane and when an object is detected in the second blind spot and said steering heading indicator means indicates the driver is traveling toward the right adjacent lane, wherein the localized audible warning will provide an audible warning inside the vehicle emanating from the left when an object is detected in the first blind spot located toward the left of the vehicle and emanating from the right when an object is detected in the second blind spot located toward the right of the vehicle for audibly warning the driver where the object is located.

18. A vehicle system for warning of warm-bodied, cold-bodied, non-moving and moving obstacles, the system comprising:

detection means for detecting the relationship of said obstacles to said vehicle, said detection means operable to detect and distinguish between warm-bodied, cold-bodied, non-moving and moving obstacles;

discrimination means for determining the state of said vehicle, said state including whether said vehicle is moving or stationary, said discrimination means determines whether said vehicle is stationary by determining if said vehicle is in park or stopped; and logic means for interpreting said vehicle state and said relationship of said obstacles and for causing forward movement of said vehicle to be automatically inhibited without driver interaction when said vehicle state indicates that said vehicle is stationary and when said detection means indicates one of said obstacles is within a predetermined proximity of said vehicle and when said obstacle is forward of said vehicle by automatically preventing said vehicle to be put in gear if said vehicle is in park or by automatically actuating a brake if said vehicle is stopped, thereby automatically preventing said driver from inadvertently driving into said obstacle, and for causing rearward movement of said vehicle to be automatically inhibited without driver interaction when said vehicle state indicates said vehicle is stationary and said detection means indicates one of said obstacles is within said predetermined proximity of said vehicle and when said obstacle is rearward of said vehicle by automatically preventing said vehicle to be put in gear if said vehicle is in park or by automatically actuating said brake if said vehicle is stopped, thereby automatically preventing said driver from inadvertently driving into said obstacle.

\* \* \* \* \*